United States Patent [19]
Wagh et al.

[11] Patent Number: 5,830,815
[45] Date of Patent: *Nov. 3, 1998

[54] METHOD OF WASTE STABILIZATION VIA CHEMICALLY BONDED PHOSPHATE CERAMICS

[75] Inventors: Arun S. Wagh, Joliet; Dileep Singh, Naperville; Seung-Young Jeong, Hinsdale, all of Ill.

[73] Assignee: The University of Chicago, Chicago, Ill.

[ * ] Notice: The term of this patent shall not extend beyond the expiration date of Pat. No. 5,645,518.

[21] Appl. No.: 617,284

[22] Filed: Mar. 18, 1996

[51] Int. Cl.⁶ ............... A62D 3/00; B09B 3/00; C04B 35/00; C04B 35/04
[52] U.S. Cl. ............ 501/155; 501/108; 501/111; 588/18; 588/252; 588/256; 588/10; 588/15
[58] Field of Search ............... 501/155, 141, 501/142, 111, 108; 588/10, 15, 249, 252, 256, 901, 18

[56] References Cited

U.S. PATENT DOCUMENTS

| | | | |
|---|---|---|---|
| 3,093,593 | 6/1963 | Arrance | 501/144 |
| 3,383,228 | 5/1968 | Rekate et al. | 501/155 |
| 3,879,211 | 4/1975 | Klotz | 501/155 |
| 3,985,567 | 10/1976 | Iwu | 501/155 |
| 5,302,565 | 4/1994 | Crowe | 501/155 |
| 5,502,268 | 3/1996 | Cote et al. | 588/249 |
| 5,645,518 | 7/1997 | Wagh et al. | 501/155 |

OTHER PUBLICATIONS

CA 95:48562, "solidification of Actinide–containing wastes in a ceramic matrix", (no month) 1981.

*Primary Examiner*—Michael Marcheschi
*Attorney, Agent, or Firm*—Cherskov & Flaynik

[57] ABSTRACT

A method for regulating the reaction temperature of a ceramic formulation process is provided comprising supplying a solution containing a monovalent alkali metal; mixing said solution with an oxide powder to create a binder; contacting said binder with bulk material to form a slurry; and allowing the slurry to cure. A highly crystalline waste form is also provided consisting of a binder containing potassium and waste substrate encapsulated by the binder.

21 Claims, 2 Drawing Sheets

METHOD OF WASTE STABILIZATION VIA CHEMICALLY BONDED PHOSPHATE CERAMICS

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory This patent application is related to co-pending application Ser. No. 08/380,922 filed on Jan. 31, 1995 U.S. Pat. No. 5,645,518 entitled "METHOD FOR STABILIZING LOW-LEVEL MIXED WASTES AT ROOM TEMPERATURE."

BACKGROUND OF THE INVENTION

1. Field of the Invention

This invention relates to a method for stabilizing large volumes of waste, and more specifically, this invention relates to a ceramic material to stabilize large volumes of low-level radioactive and mixed wastes and a method for producing the ceramic material.

2. Background of the Invention

Low-level mixed wastes contain hazardous chemical and low-level radioactive materials. Generally, mixed waste streams contain aqueous liquids, heterogeneous debris, inorganic sludges and particulates, organic liquids and soils. The projected volume over the next five years of the mixed waste generated by the U.S. Department of Energy alone is estimated at approximately 1.2 million cubic meters.

Stabilization of these mixed wastes requires that both phases of contaminants are stabilized effectively.

Typical approaches to stabilization and storage of these mixed wastes include vitrification. For example, one process (Crowe, U.S. Pat. No. 5,302,565) requires firing temperatures of at least 1,850° C. for at least 12 hours to produce ceramic containers. However, such processes, associated with high temperatures are costly. In addition, vitrification of waste streams often result in the lighting off of volatile components contained in the waste stream. This lighting off results in the unwanted generation of secondary waste streams.

One system for producing cements having ceramic type properties does not require high temperatures for final crystallization (Sugama et al. U.S. Pat. No. 4,436,555, assigned to the instant assignee). However, that process results in ammonia being liberated during processing and storage, which leads to container corrosion, and also explosive compositions if wastes contain nitrates.

The inventors also have developed ceramic fabrication methods to both stabilize and encapsulate waste. These methods offer a number of advantages over typical portland cement grout-, polymer- and ceramic-encapsulation techniques. Ceramic encapsulation systems are particularly attractive given that the bonds formed in these systems are either ionic or covalent, and hence stronger than the hydration bonds in portland cement. Since waste stabilization using ceramics is due to chemical stabilization as well as physical encapsulation, the leaching characteristics of these final waste forms are superior to the above-identified waste forms which are mainly dependent on physical encapsulation. Also, unlike prior vitrification requirements, the exothermic ceramic formulation process needs no thermal treatment or heat input, resulting in waste stabilization being done economically on site and without capital intensive equipment and transportation procedures.

However, exothermic ceramic formulation processes are not suitable for the economic encapsulation of large amounts of waste. The inventors have found that the production of large amounts of heat during reaction causes the reacting solution to boil, leading to flaws (i.e. pores) in the final ceramic form, short workability time, and fast, uneven curing. While reaction temperatures may be partially controlled by circulating cold water around the slurry container or mold in which the sample is setting, sufficient heat conduction is not present as sample sizes increase.

Another drawback to typical ceramic waste production processes is that such systems foster low pH conditions. For example, acid-base ceramic encapsulation reactions begin in severe acidic conditions, near pH 0. Such severe conditions destabilize HgS to a leachable form prior to its physical encapsulation. Low pH conditions also lead to $CaCO_3$ decomposition.

A need exists in the art for a high volume waste stabilization and solidification method that does not generate high amounts of heat during the encapsulation process. The process must also be operational at moderate pH conditions so as to facilitate stabilization of wastes which are unstable at low pH. The final product must exhibit low leachability and high durability in aqueous systems.

SUMMARY OF THE INVENTION

An object of the present invention is to overcome many of the disadvantages of the prior art in the encapsulation and stabilization of low-level, radioactive, mixed and other wastes.

Another object of the present invention is to provide a temperature-controlled ceramics formation process to encapsulate and stabilize wastes. A feature of the invention is the utilization of readily available compounds to regulate the acid-base reactions associated with the formation of ceramics waste forms. An advantage of the invention is maintaining a low temperature during the formation process.

Yet another object of the present invention is to provide a low temperature reaction liquor in a process to stabilize mixed waste using chemically bonded phosphate ceramics. A feature of the present invention is the moderation of the pH of the reaction liquor. An advantage of the present invention is that the lower reaction temperatures facilitate the formation of more dense waste forms. Another advantage is that certain waste materials, which decompose or destabilize in low-pH environs, are more completely stabilized.

Still another object of the present invention is to provide a ceramic waste form high in potassium. A feature of the invention is a high amount of crystalline phase in the final waste form. An advantage of the invention is a more dense, less porous waste form.

Briefly, the present invention provides for a method for regulating the reaction temperature of a ceramic formulation process comprising supplying a solution containing a monovalent alkali metal; mixing said solution with an oxide powder to create a binder; contacting said binder with bulk material to form a slurry; and allowing the slurry to cure.

The invention also provides for a ceramic waste form comprising a potassium containing ceramic binder and waste substrate encapsulated by the binder.

BRIEF DESCRIPTION OF THE DRAWING

These and other objects and advantages of the present invention will become readily apparent upon consideration of the following detailed description and attached drawing, wherein.

DETAILED DESCRIPTION OF THE INVENTION

This invention teaches two processes for chemically controlling the reaction temperature in ceramic formulation processes. These two processes allow for the formation of large final waste forms for a wide variety of waste streams, said waste streams containing ash, cement, silica, Bayer process wastes (red mud), potliner residue, pyrophorics, salt mixtures, volatiles, such as mercury, lead, cadmium, chromium, and nickel, and unstable compounds which cannot be treated by conventional high temperature techniques such as vitrification. The invention is also applicable to stabilize secondary waste streams resulting from thermal treatment processes, such as vitrification and plasma hearth processes.

Radioactive materials are also stabilized by this method, such materials including uranium, plutonium, thorium, americium, fission products, and any other radioactive isotopes. Irradiated lead, hazardous metals, flue-gas desulfurization residues are also stabilized and/or encapsulated by the invented method.

The invention also can be used to stabilize certain RCRA organics. The inventors have found that certain of these organics do not retard the setting of phosphate ceramics. In one scenario, organics such as naphthalene and dichlorobenzene are trapped in activated carbon which in turn is stabilized in the phosphate matrix by the method claimed herein. This method of stabilization can be utilized in situations wherein mixed waste contains trace amounts of organics such as polychlorinated biphenyls, dioxin, dichlorobenzene, naphthalene, among others. As such, the invented method is superior to encapsulation methods wherein cement is utilized, in that cement cannot stabilize in the presence of organics.

The method may also be used to stabilize and solidify wastes containing salts, such as chlorides, nitrates, nitrides, sulfites and sulfates. Conventional cement technology cannot stabilize these waste streams.

Ash waste may be consolidated by this process to 80 volume percent of its original volume. Experiments by the inventors show good reaction and bonding between amorphous and reactive silica from fly ash and bottom ash with phosphate matrix. Formation of hard silico-phosphate bonds via this reaction can be used for the stabilization of hazardous silica compounds such as asbestos. The invention also encapsulates and stabilizes silica based filter aids, such as vermiculites and perlites, which are used in the removal of contaminants from liquid waste streams.

The two invented temperature control processes yield superior-strength final forms having uniform high density throughout and improved microstructure compared to typical methods of ceramics formation.

A salient feature of the low-temperature ceramic-waste formulation processes is an acid-base reaction, such as that depicted in Equation 1, below. Typically, the reaction produces phosphate of MgO (Newberyite).

$$MgO+H_3PO_4+2H_2O \rightarrow MgHPO_4.3H_2O \qquad \text{Equation 1}$$

The acid base reaction results in the reaction of the waste components with the acid or acid-phosphates. These reactions lead to chemical stabilization of the waste. In addition, encapsulation of the waste in the phosphate ceramics formed by the reaction products results in physical encapsulation of the waste components.

As noted supra, a problem with the above-disclosed reaction sequence is the extremely low pH that exists in the reaction liquor as a result of the presence of the phosphoric acid. This low pH leads to destabilization of some waste materials during encapsulation, and higher reaction temperatures which ultimately renders weak final waste forms.

The two processes for minimizing the exothermicity of the acid-base reactions are disclosed as follows: Process #1 deals with pretreating phosphoric acid with a carbonate, bicarbonate or hydroxide of a monovalent metal prior to mixing with an oxide or hydroxide powder so as to buffer the acid. An exemplary reaction for process #1 is illustrated in Equation 2, below:

$$H_3PO_4+M_2OO_3+M'Oxide \rightarrow M'HPO_4 \qquad \text{Equation 2}$$

whereby M is a monovalent metal which can be selected from the group consisting of potassium, sodium, lithium. M'oxide designates the oxide powder, whereby M' is a metal which can be selected from the group consisting of Mg, Al, Ca, and Fe. As noted above, M' also can be supplied as an hydroxide.

Process #2 discloses a method for bypassing the use of acid altogether and mixing the oxide powder with a dihydrogen phosphate to form a ceramic at a higher pH. Illustrations of process #2 are Equations 3–5, below:

$$MgO+LiH_2PO_4+nH_2O \rightarrow MgLiPO_4.(n+1)H_2O \qquad \text{Equation 3}$$

$$MgO+NaH_2PO_4+nH_2O \Delta MgNaPO_4.(n+1)H_2O \qquad \text{Equation 4}$$

$$MgO+KH_2PO_4+5H_2O \rightarrow MgKPO_4.6H_2O \qquad \text{Equation 5}$$

Solid Waste Preparation Detail

Solid wastes first can be manipulated in powder form by grinding the waste to an average, preferable approximate particle size of 8 to 10 micrometers ($\mu$m). However, particles can range in size from between approximately 5 $\mu$m to several millimeters.

Ash and cement wastes can be first mixed with the starter oxide or hydroxide powders using a vibratory shaker, or any conventional agitator. Weight percentages of the mixture varies at this juncture, but can range from between approximately 15 percent oxide to 50 percent oxide. Typically, an even weight percent (50:50) of oxide to solid waste is sought. However, the inventors have successfully encapsulated and stabilized single-component fly ash at weight percents as high as 85 percent ash to 15 percent MgO powder, which makes this technique particularly attractive for utilities where single-component fly ash is a major land-filling problem.

The above mixture of powders is then added to pretreated phosphoric acid solution (process #1) or to the dihydrogen phosphate solution (process #2) to form a reaction slurry. The slurry is mixed using a mixer for 10 minutes to 30 minutes during which it forms a viscous paste. The paste sets in a few hours once poured into a mold. Typically, no pressure is applied to the now-molded slurry. The slurry gains full strength in approximately one day.

Mold shapes can vary, depending on the configuration of the ultimate deposition site, and can be selected from a myriad of geometrical shapes including cuboid, pyramidal, spherical, planar, conical, cylindrical, trapezoidal, rectangular, and the like. Generally, molds having the shape and size of a typical 55 gallon drum are used for waste management applications.

Liquid Waste Processing Detail

In dealing with liquid waste, the invented temperature regulated encapsulation method provides a simplified approach for an end user compared to more typical encapsulation methods. For example, acid phosphates systems are made by adding said phosphate to the liquid on site, a process similar to that practiced in the cement industry. As such, liquid wastes, such as tritiated water, are easily and economically encapsulated with this procedure.

Either process #1 or process #2 can be used if solely liquid is being encapsulated and stabilized. In process #1, the waste liquid is first combined with acid to form a pH modified solution. This modified solution is then mixed with oxide powder. Alternatively, the waste liquid can be added to oxide powder, to form a slurry, and then mix the slurry with acid.

In process #2, the liquid waste is mixed with dihydrogen phosphate solution. Then, oxide powder is added. As above, an alternative procedure is to first combine the liquid waste with oxide powder and then add the dihydrogen solution.

The inventors have found that the ratio of acid to water, selected from a range of between approximately 37:63 to 50:50, produces good results. An acid:water ratio of 50:50 is most preferred. If the liquid waste contains more than the required amount of water, then correspondingly less water is added to the acid to bring the water weight percent of the liquid waste-acid mixture up to 50 percent.

In situations involving liquid-solid waste streams, the liquid fraction of the waste stream can be prepared as outlined directly above. The resulting liquid waste-acid mixture is then mixed with a mixture of solid waste and oxide powder in weight percent ranges similar to those outlined above for solid waste processing. When using powder mixtures containing MgO and dibasic phosphate, weight percent ratios of the oxide to the phosphate selected from the range of approximately 87:13 to 77:23 produce good results.

Phosphate and Oxide Reactant Detail

Several phosphate systems can be used for the stabilization of the target chemical, radioactive and mixed waste streams. Some final phosphate-ceramic forms include, but are not limited to phosphates of Mg, Mg—Na, Mg—K, Al, Zn and Fe, whereby the metals are derived from starter oxide powders and hydroxide powders (such as in process #1). In process #2, the metals in the final phosphate ceramic forms are derived from both the starter powders and the dihydrogen phosphates. Exemplary dihydrogen phosphates used in process #2 include, but are not limited to, phosphates of potassium, sodium and lithium. The acid component may be concentrated or dilute phosphoric acid or acid phosphate solutions such as dibasic or tribasic sodium or potassium, or aluminum phosphates. The setting times for the pastes formed by the reaction ranges from a few hours to a week. The phosphates attain their full strength in approximately three weeks.

Oxide powders can be pretreated for better reactions with the acids. One technique includes calcining the powders to a typical temperature of between approximately 1,200° C. and 1,500° C. and more typically 1,300° C. The inventors have found that the calcining process modifies the surface of oxide particles in a myriad of ways to facilitate ceramic formation. Calcining causes particles to stick together and also form crystals; this leads to the slower reaction rates that foster ceramic formation. Fast reactions tend to form undesired powdery precipitates.

Another reaction enhancement technique is washing the powders with dilute nitric acid and then water.

A myriad of oxide and hydroxide powders can be utilized to produce the ceramic system, including but not limited to MgO, Al(OH)$_3$, CaO, FeO, Fe$_2$O$_3$, and Fe$_3$O$_4$.

MgO and Al(OH)$_3$ powders are available through any commercial supply house, such as Baxter Scientific Products, McGaw Park, Ill. The myriad iron oxides enumerated above could actually be supplied as part of some waste streams such as those generated in conjunction with soil and also in low-temperature oxidation systems which destroy organics using iron compounds.

Process #1—pH Modification of Acid Solution

Surprisingly and unexpectedly, the inventors have found that when carbonate, bicarbonate, or hydroxides of monovalent metals (such as K, Na, Li, and Rb) are used to pretreat the acid prior to the acid-base reaction, a decrease in reaction temperature results. Also unexpectedly, the inventors have found that the addition of potassium containing alkali compounds (such as K$_2$OO$_3$) result in a more crystalline waste form that is impervious to weathering, compressive forces and leaching.

Figure 1:
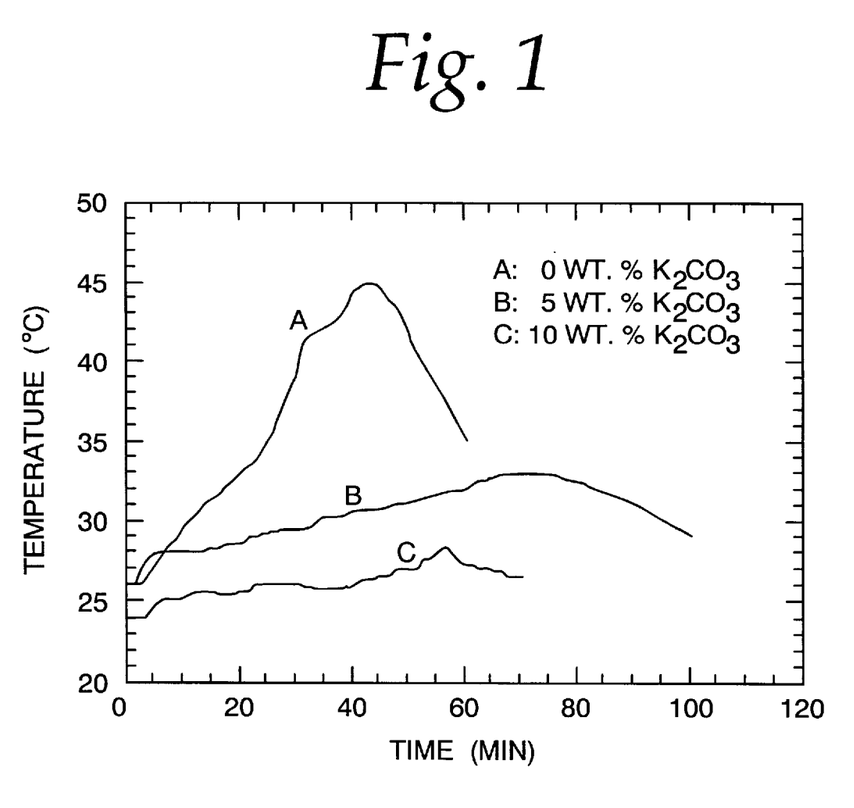
FIG. 1 is a temperature graph showing the effects of the addition of a carbonate solution to the ceramic processing liquor, in accordance with the features of the present invention.
Figure 2:
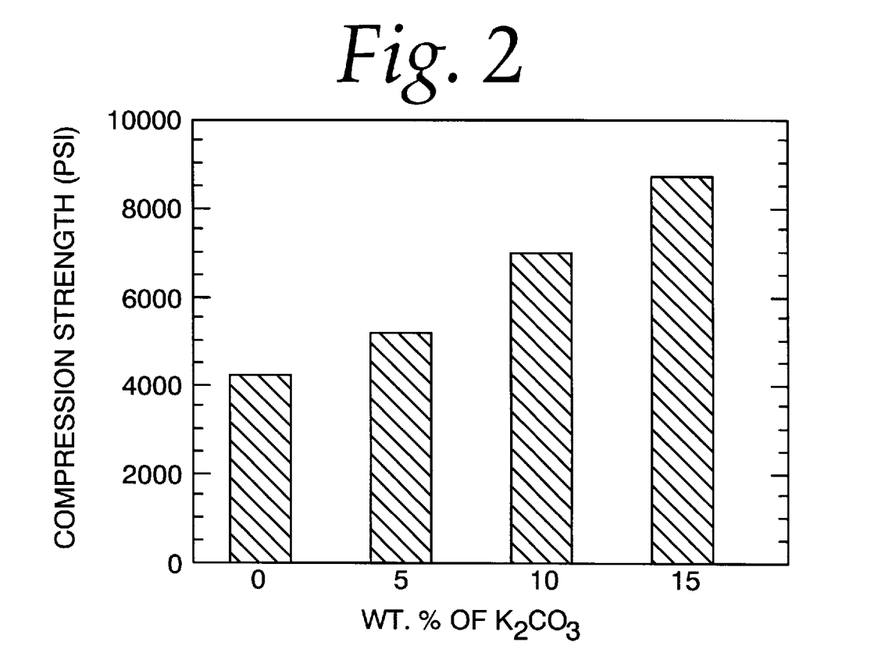
FIG. 2 is a graph showing the compression strength of an exemplary waste form, in accordance with the features of the present invention.
Figure 3:
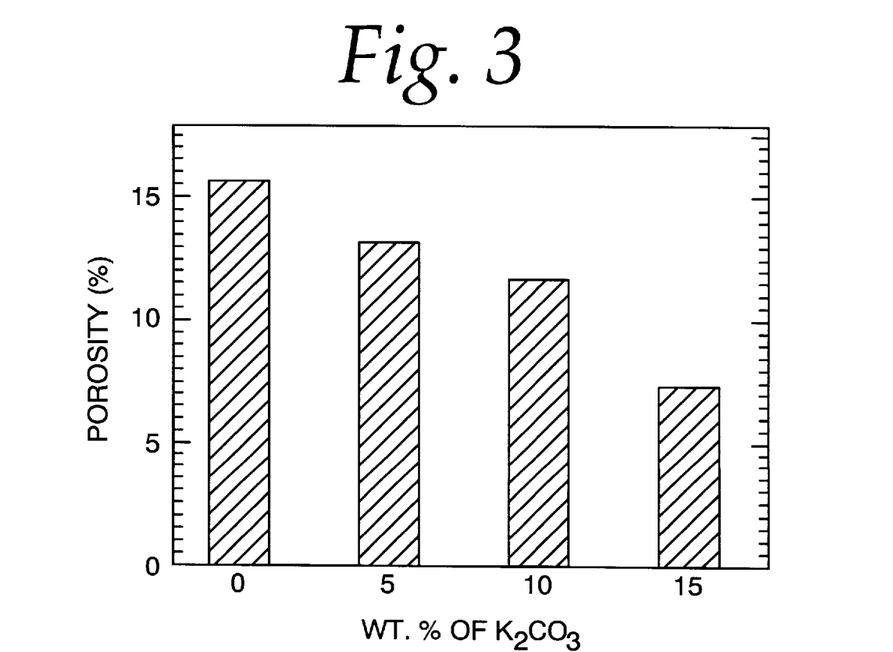
FIG. 3 is a graph depicting the porosity of an exemplary ceramic form, in accordance with the features of the present invention.

Furthermore, and as can be determined in FIGS. 1–3, the higher the concentration of potassium containing compounds (such as K$_2$OO$_3$, KHCO$_3$, and KOH) in the pre-reaction mixture, the more crystalline the final product. This high crystallinity correlates to higher compression strength and lower porosity.

The carbonate in the pretreatment process decomposes into hydroxide, with an evolution of CO$_2$. This results in a partial neutralization of the acid, which in turn reduces the rate of reaction and the rate of heat evolution. Typically, pH of the reaction slurry is raised from zero to between approximately 0.4 and 1.

Overheating of the slurry is thus avoided by this pH adjustment mechanism. Second, and as more thoroughly disclosed infra, the use of potassium carbonate generates more crystalline, and therefore more stable, phosphate complexes.

EXAMPLE 1

K$_2$OO$_3$ Buffer 5, 10 and 15 weight percent of potassium carbonate K$_2$OO$_3$ was added to a 50 weight percent dilute solution of phosphoric acid. The resulting solution was allowed to equilibrate for several hours. In the equilibration process, the pH of the solution raised from near zero to 0.4, 0.6 and 0.9, respectively. After equilibration, 100 grams of the solution was mixed with 50 grams of an oxide powder. The oxide powder was a combination of calcined MgO and boric acid in a 85 weight percent MgO to 15 weight percent boric acid ratio.

While adding the MgO and boric acid mixture to the acid solution, the temperature of the slurry, for phosphate concentrations ranging from 0 to 10 weight percent, was monitored. FIG. 1 depicts the temperature rise in each case. System A was a simulation of a process wherein no K$_2$OO$_3$ was added. The maximum temperature reached in this system was 45° C. in a 50 cc volume sample. For samples B and C made with 5 and 10 weight percent of K$_2$OO$_3$, the temperature rise was 8° C. and 2° C., respectively. No temperature increase was noted when 15 weight percent of K$_2$OO$_3$ was added to the acid prior to reaction.

X-ray diffraction analysis of the samples showed high crystallinity with samples made with 15 weight percent of $K_2OO_3$. Samples made with 5 and 10 weight percent of $K_2OO_3$ were more glassy. As can be noted in Table 1, below, the X-ray diffraction studies of the samples identified unique mineral phases that are responsible for the desired low solubility product constant of the final product. This superior final product, a chemically bonded composite ceramic, is designated hereafter as MKHP.

TABLE 1

Mineral composition of Ceramic Developed Via $K_2CO_3$ Addition

| Mineral Phase | Chemical formula | weight % |
|---|---|---|
| Magnesium potassium phosphate | $MgKPO_4.6H_2O$ | 52 |
| Lunebergite | $Mg_3B_2(PO_4)_2(OH)_6.6H_2O$ | 24 |
| Newberyite | $MgHPO_4.3H_2O$ | 14 |
| Residual Magnesium Oxide | MgO | 10 |

Surprisingly and unexpectedly, magnesium potassium phosphate (MKP) is a new component in the material that formed exclusively by the addition of $K_2OO_3$. MKP represents a superior phase for waste form matrix materials, given its solubility constant of $10^{-11}$, which is five magnitudes lower than that of newberyite which is $10^{-6}$. All of the phases depicted in Table 1 have very low solubilities in ground water, and lünebergite and newberyite are natural minerals which are hence stable in ground water environments.

Porosity characteristics of the samples varied widely. In the $K_2OO_3$ 5- and 10-weight percent samples, the glass phase of the samples was abundant, with a concomitant higher amount of cracking and therefore porosity. By comparison, the $K_2OO_3$ 15 weight percent samples showed an open porosity of approximately 6.1 percent. Density was 1.77 g/cc, and closed porosity was 10.2 volume percent. Compression strength was approximately 3,700 psi.

EXAMPLE 2

$K_2OO_3$ Buffer+Fly Ash

The matrix material disclosed in Example 1 was used in Example 2. Starter powder composition was 70 weight percent fly ash, 25.5 weight percent calcined MgO, and 4.5 weight percent boric acid. The solution used was a 50 weight percent diluted $H_3PO_4$ buffered with $K_2OO_3$. The solution was poured into a mixer, such as a cement mixer, and the powder was slowly added until all the powder was mixed with the solution in approximately 48 minutes. A cylindrical sample of 1,000 ml was made.

The maximum temperature during mixing and setting ranged from between approximately 50° C. and 60° C. These temperatures did not increase, even when smaller weight percents of $K_2OO_3$ were used. For example, when 10 weight percent of $K_2OO_3$ was used, even at higher volumes (1,200 cc), maximum temperatures attained were between 56° C. and 58° C.

The inventors have found that in the absence of $K_2OO_3$, the concentration of MgO in the final product is high, with Newberyite as the main crystalline phase in the material.

Data on compression strength and porosity of the materials made in Example 2 are shown in FIGS. 2 and 3. These figures show that as the content of $K_2OO_3$ increases, the strength increases and the porosity drops. When $K_2OO_3$ is 15 weight percent in the solution, the compression strength is 8,750 psi (which is more than twice that of portland cement) while porosity is reduced to 7.5 percent.

EXAMPLE 3

Sodium Carbonate 5, 10, and 15 weight percent of sodium carbonate ($Na_2OO_3$) was added to 50 weight percent of a dilute solution of phosphoric acid and the resulting solution was allowed to equilibrate for several hours. The pH of the solution was raised in the process from near zero to approximately 2.3. 100 grams of this solution was reacted with 30 grams of a mixture of calcined MgO and boric acid (85 weight percent MgO and 15 weight percent boric acid) and 70 grams of fly ash.

The properties of the 5 weight percent $Na_2OO_3$ sample were measured. Density was 1.7 g/cc and its open porosity was 8.6 volume percent. Microstructural analysis of the samples revealed that the sample was primarily glassy except for the fly ash particles. This process shows that completely glassy phase material can be made by the process described above.

EXAMPLE 4

Hazardous Material+MKHP

Two different hazardous material waste streams were treated. An iron oxide-iron chloride waste stream (95 weight percent $Fe_2O_3$+5 weight percent $FeCl_3$) was spiked with 0.5 weight percent of $Ce^{3+}$ and $Ce^{4+}$ as surrogates of $U^{3+,4+}$ and $Pu^{3+,4+}$, incorporated as oxide. Also added was 0.5 weight percent of $Ce^{4+}$ as a surrogate of $U^{4+}$ and $Pu^{4+}$, incorporated as oxide.

The second waste stream was iron phosphate waste stream ($FePO_4$) spiked with 0.5 weight percent of Pb to represent hazardous component, introduced as soluble nitrates.

Both waste streams were stabilized via the carbonate modification method of Process #1. Containment of $Ce^{3+}$, $Ce^{4+}$ and Pb was 8.7 ppm, <0.09 ppm and <0.2 ppm, respectively. In as much as the 5 ppm regulatory limit on Pb is due to be revised downward to 0.37 ppm, the results show that the invented encapsulation procedure provides an acceptable method of containment.

Process #2—Dihydrogen Phosphate

Instead of adding carbonate to reactants to reduce reaction temperatures, the inventors have devised a simplified method to achieve the same results. This second process reacts dihydrogen phosphates of potassium, sodium, lithium, or any other monovalent alkali metal with an oxide to form a phosphate ceramic. This method forms a ceramic at higher pH while minimizing heat generation. An exemplary ceramic formed via this process is magnesium potassium phosphate hexahydrate (MKP), which is formed via the reaction mechanism depicted in Equation 5, above.

The inventors found that with the avoidance of acid in the initial reaction slurry, initial pH values are approximately 6.2. Consistent with the fact that the dissolution of $KH_2PO_4$ is an endothermic process, the inventors found that at initial mixing, the temperature of the slurry slightly decreases. As the dissolution and reaction of MgO progresses, however, slurry temperatures increase to approximately 30° C.

EXAMPLE 5

MKP Ceramic Fabrication

One mole of calcined and ground MgO was mixed with one mole of ground potassium dihydrophosphate ($KH_2PO_4$) crystals. The mixture was slowly added to 5 moles of water to form a paste. When the paste was well mixed, it was poured into cylindrical molds, of 1 cm in diameter and 20 cc volume. Hard ceramic forms developed in approximately 1 hour.

X-ray diffraction analysis revealed that all major peaks were MKP. No peaks of the potassium dihydrophosphate were noted, indicating that it all reacted.

Open porosity, measured by the water intrusion method, was calculated as 2.87 volume percent. Density was 1.73 g/cc. Given a theoretical density of 1.88 g/cc, the total porosity is calculated to be 8.19 volume percent. Thus, closed porosity (i.e., that porosity that is not accessible from outside the sample) was 5.33 g/cc.

These values show that MKP is much denser than Mg-phosphate ceramic, wherein total porosity is approximately 30 percent.

EXAMPLE 6
MKP+Fly Ash

MKP ceramic synthesized in Example 5 was used to develop waste forms of fly ash. Samples were made using three different powders which are mixtures of calcined MgO and $KH_2PO_4$ in mole ratios of 1:1, 1.5:1 and 2:1. These powders were mixed with fly ash in equal weight proportions using a hopper and feeder mechanism. The final mixtures of the powders were combined at a slow but constant rate with 5 moles of water in a cement mixer to form a slurry.

The slurry was poured into 1.5 gallon molds as well as 1 liter molds. Smaller samples were made by stirring the powders in water and using 1 cm diameter, 20 cc cylindrical molds. All samples set in approximately 1 hour and hardened fully after one week.

Unlike the material described in Examples 1 and 2, the temperature of the slurry does not rise during mixing, but only during setting. This eliminates the prior art problem of evaporation of contaminants that occurs as a result of heat generation during the mixing stage. The inventors found that temperatures of the slurry before setting generally do not exceed 30° C. As such, no evaporation of either the water fraction or the components of the waste occur. Once the slurry starts setting, the temperature rises. However, maximum temperatures (approximately 75° C.) are reached after the sample sets into a hard monolith, thereby not resulting in any detrimental effect on the final waste form. Furthermore, the inventors have found that the temperature rise is not proportional to the size of specimens but in fact tapers off as the specimen size is increased. This facilitates the target waste encapsulation sizes of 55 gallons.

The invented process utilizing MKP generates superior final ceramic forms. Open porosity values of the waste forms was found to be approximately 4.18 volume percent. Measured density was 1.8 g/cc. Given the estimated theoretical density of 2.05 g/cc, the total porosity is 8.9 volume percent, which is much lower than Mg-phosphate ceramic found in the prior art. Closed porosity was calculated as 4.72 volume percent. Compression strength of the sample was 6,734 psi, which is more than 50 percent stronger than portland cement concrete.

EXAMPLE 7
Boric Acid+MKP+Ash

Samples of fly ash waste forms were made with MKP matrix and calcined MgO powder in which from 0–5 weight percent boric acid was added. The addition of boric acid delayed the temperature rise of the reacting slurry. Therefore, the addition of boric acid facilitates the large scale processing of waste streams where more time is needed to mix and pour the slurry.

EXAMPLE 8
$CaCO_3$ Stabilization

As noted supra, $CaCO_3$ decomposes in low pH environs. As a result, if waste streams contain this compound, carbon dioxide is produced which bubbles from the reaction slurry. Such bubbling makes the set product porous and hence permeable to ground water. Strength is also compromised.

Cement sludge, typical of cement-containing waste streams was prepared. The composition of the waste stream is depicted in Table 2, below:

TABLE 2

Cement Waste Stream Composition

| Component | Weight Percent |
|---|---|
| Activated Carbon | 10 |
| Fly Ash | 10 |
| Water | 10 |
| Concrete | 50 |
| Plaster of Paris | 10 |
| Haematite (Fe2O3) | 3 |
| Alumina | 3 |
| Perlite | 1.5 |

Samples were made by two methods. In the first method, slurry was formed with $H_3PO_4$ as the reacting acid and waste forms containing approximately 30 volume percent of waste were fabricated. During this first process, the slurry formed tiny bubbles of $CO_2$, which made the samples porous.

When samples were made with the MKP process disclosed in Examples 5 and 6, supra, wherein $KH_2PO_4$ was used as the acid phosphate, no evolution of $CO_2$ occurred. Comparison of the sample values are presented in Table 3, below:

TABLE 3

Physical properties of chemically bonded waste forms.

| Parameter | $H_3PO_4$ Stabilization | $KH_2PO_4$ Stabilization |
|---|---|---|
| pH of acid soln. | 0.2 | 4 |
| Open porosity (volume percent) | 28–33 | 6.2 |
| Density | 1.2–1.3 | 1.77 |

Table 3 shows that the waste forms generated via the MKP process are denser and contain relatively small amounts of open porosity, thereby illustrating the superiority of the invented process compared to processes whereby large amounts of acid are utilized.

EXAMPLE 9

Red Mud+MKP

The refining of bauxite to produce aluminum oxides results in the production of large amounts of residue, known as red mud. Red mud consists of 50 percent inorganic oxides, other compounds and hazardous metals. Tremendous amounts of red mud are generated annually.

Large volumes of red mud are easily stabilized when combined with the invented phosphate ceramic binder. If the reaction slurry, loaded with red mud, is poured as a barrier layer, it not only bonds with the substrate soil but also enters fissures in the soil and quickly hardens to form a nonporous ceramic layer. For example, red mud ceramics produced by the invented process exhibit low porosities ($\approx 2$ volume percent) and high compression strengths (4,944 psi). The materials display a low porosity and high durability in a range of acid and basic environments, thereby making them ideal for mining industry applications, pond liners, tailing liners, waste pond dikes, and quick-setting grouts.

A myriad of red mud waste can be utilized in producing final structural forms. Red mud waste used by the inventors was produced from gibbsitic bauxite. Essentially, it was dry mud collected from the periphery of a red mud waste pond. Its contents were ≈50 weight percent iron oxide ($Fe_2O_3$), ≈16.5 weight percent alumina ($Al_2O_3$), ≈3 weight percent silica ($SiO_2$), ≈5.7 weight percent calcium oxide (CaO), and ≈6.8 weight percent titania ($TiO_2$). X-ray diffraction analysis identified haematite ($\alpha$-$Fe_2O_3$), goethite ($\alpha$-FeOOH), calcite ($CaCO_3$), boehmite ($\gamma$-AlOOH), anatase ($TiO_2$), and bayerite ($\beta$-AlOOH) as the major crystalline phases. Surprisingly and unexpectedly, the inventors have learned that the hydrated phases, i.e., boehmite, bayerite and goethite, facilitate the development of phosphate bonds in the binding process.

The amorphous characteristics of the alumina and silica components of red mud, which is discussed above, plays a major role in the ceramic bonding mechanisms. The inventors have found that it is the characteristically smaller particles of amorphous material that readily participates in the acid-base reaction and therefore facilitates the setting reaction during ceramic formation.

As discussed supra, MgO, when reacted with phosphoric acid or an acid phosphate solution, forms magnesium phosphate precipitate in an exothermic reaction. This reaction can be controlled by use of calcined MgO and also by adjusting the feed rate of the solid phase (i.e., the red mud powder+oxide+boric acid) to the solution.

In one embodiment, calcined MgO first is mixed with red mud powder in a specific weight percent, disclosed in Table 4, below. Crushed dry red mud is a super-fine material with more than 60 weight percent of the particles finer than 10 mm. Particle sizes ranging from between 1 and 5 mm provide good results, so that grinding of the mud may not always be necessary prior to combining with the MgO.

TABLE 4

Physical Properties of Red Mud Ceramics

| Waste loading (wt %) | Maximum particle size (mm) | Density (g/cm³) | Open Porosity (%) | Compression Strength (psi) |
| --- | --- | --- | --- | --- |
| 40 | 5 | 2.19 | 0.82 | 4944 |
| 40 | 1 | 2.1 | 1.09 | 4294 |
| 50 | 5 | 2.26 | 2.98 | 2698 |
| 55 | 5 | 2.29 | 1.94 | 2310 |

The dry mixture is then reacted with the phosphoric acid or an acid phosphate solution via constant stirring. This results in a low-viscosity paste which thickens as the reaction proceeds. The paste is then poured into cylindrical molds of 1.9 cm in diameter. Dense ceramics form in approximately 15 minutes, with complete hardening occurring in 2 to 24 hours. Prior to testing, the samples were stored for three weeks.

Density was measured by weighing the samples and measuring the dimensions and determining the volume. Open porosity was determined by water immersion in which the pre-weighed samples were immersed in water at 70° C. for 2 hours. The samples were then cooled in the water and then removed from the water. Excess water was wiped from the surface of the samples and the samples were weighed again to determine the amount of water that filled the open pores. This higher weight (compared to pre-immersion weights) yielded the volume of the open pores in the samples, thereby allowing for calculation of the open porosity.

Compression strength was measured with an Instron™ machine used in compression mode.

Waste loadings of the samples ranged from 40 to 55 weight percent. As an example, a 40 weight percent waste loading means that 40 grams of a sample is red mud and 60 grams is both binder and water. Densities of samples with red mud are slightly higher than that of pure matrix (binder) material, which is 1.73 gm/cm³. Red mud density is approximately 3.3 g/cm³.

As can be determined in Table 2, the open porosity of the red-mud-loaded samples was low compared to the ≈20 percent value seen in cement. Furthermore, the compression strength of the samples with 40 weight percent loading was found to be higher than the 4,000 psi value for portland cement concrete.

Scanning electron microscopy (SEM) and energy dispersive X-ray (EDX) analyses of a fractured red-mud sample revealed a glassy region and a granular region. Both of these regions are well bonded. The glassy phase was cracked everywhere while the granular phase displayed only those cracks emanating from the glassy phase. Table 5, below, provides the general elemental composition of each phase. The values contained therein are averages of three measurements taken at three different locations of each phase.

The granular phase is attributable to the red mud and the glassy phase is mostly the phosphate matrix. As shown, the granular phase was found rich in red-mud elements such as Fe and Al, while the glassy phase is rich in Mg phosphate elements such as Mg and P.

TABLE 5

Elemental distributions of glassy and granular phases of red-mud ceramics

| | Elements | | | | |
| --- | --- | --- | --- | --- | --- |
| Phase | Fe | Al | Mg | P | Other |
| Glassy | 5.78 | 4.7 | 23.53 | 34.23 | 31.76 |
| Granular | 23.66 | 18.6 | 5.3 | 16.2 | 36.2 |

That significant amounts of phosphate and some magnesium are also in the granular phase indicates that phosphate binding occurred here with Fe and Al as the cations.

The relatively few cracks seen in the granular phase (red mud) portion of the samples indicates that the strength of the invented material is due to this phase. Improving the strength of the ceramic therefore entails reducing the amount of the glassy phase or reinforcing the glassy phase with particulates. One method for such reinforcement is to incorporate finer red mud in the starter powder so as to facilitate more consistent distribution and better particle reinforcement. Grinding the red mud prior to mixing with the oxide powder is one way to obtain this finer red mud material.

While the invention has been described with reference to details of the illustrated embodiment, these details are not intended to limit the scope of the invention as defined in the appended claims.

For example, in as much as process #2 utilizes $KH_2PO_4$, and in as much as $KH_2PO_4$ has components of common fertilizer, i.e. potash ($K_2O$) and phosphate ($P_2O_5$), process #2 makes it possible to use high potash and high phosphate fertilizer to stabilize soils containing contaminants.

Also, given that red mud contains high concentrations of oxides, it is feasible to mix red mud with MKP to generate the stable waste forms otherwise generated using process #2. This modification precludes the need for supplying and pretreating oxides, such as MgO in red mud stabilization procedures.

The embodiment of the invention in which an exclusive property or privilege is claimed is defined as follows:

1. A method for regulating reaction temperature of a ceramic formulation process comprising:
   a) mixing a solution containing a monovalent alkali metal with an oxide powder to create a binder;
   b) contacting said binder with bulk material to form a slurry; and
   c) allowing the slurry to cure.

2. The method as recited in claim 1 wherein the solution containing the monovalent alkali further comprises phosphoric acid and a compound selected from the group consisting of M-carbonate, M-bicarbonate, M-hydroxide, and combinations thereof, where M is a monovalent alkali metal.

3. The method as recited in claim 2 wherein a weight ratio of the compound to the phosphoric acid is selected from between approximately 5:95 and 15:85.

4. The method as recited in claim 1 wherein the monovalent alkali metal is selected from the group consisting of lithium, sodium, potassium, and combinations thereof.

5. The method as recited in claim 1 wherein the oxide is an oxygen containing compound selected from the group consisting of calcined MgO, $Mg(OH)_2$, $Al(OH)_3$, FeO, $Fe_2O_3$, $Fe_3O_4$, CaO, crushed dibasic Na phosphate crystals mixed with calcined MgO, and combinations thereof.

6. The method as recited in claim 1 wherein the binder and the bulk material is combined in a weight percent ratio of oxide powder to bulk material of from between approximately 15:85 and 50:50.

7. The method as recited in claim 1 wherein the solution containing a monovalent alkali metal is a dihydrogen phosphate.

8. The method as recited in claim 7 wherein the dihydrogen phosphate is mixed with the oxide powder in a molar ratio of between approximately 1:1 and 2.5:1.

9. The method as recited in claim 1 wherein the monovalent alkali metal is selected from the group consisting of Li, Na, and K.

10. The method as recited in claim 1 wherein the bulk material is ground to a particle diameter of between approximately 4 microns and 75 microns.

11. The method as recited in claim 2 wherein the phosphoric acid is 10 percent to 50 percent diluted.

12. The method as recited in claim 1 wherein the bulk material comprises ash or cement or silica or red mud or pot liner residue or radioactive isotopes or irradiated lead or hazardous metals or flue-gas desulfurization residue or combinations thereof.

13. A crystalline ceramic waste form comprising;
   a.) a ceramic binder; and
   b.) waste that is chemically stabilized and encapsulated with said binder without heat input, wherein the ceramic binder comprises magnesium phosphate, lunebergite, newberyite and magnesium oxide.

14. The ceramic waste form as recited in claim 13, wherein the magnesium phosphate is selected from the group consisting of magnesium potassium phosphate and magnesium sodium phosphate.

15. The ceramic waste form recited in claim 13 wherein the waste exists as particles ranging in size from between approximately 5 microns and 5 millimeters.

16. The ceramic waste form as recited in claim 13 wherein the waste is present in the waste form in a weight percent of between approximately 10 weight percent and 85 weight percent.

17. The ceramic waste form as recited in claim 13 wherein the waste substrate comprises ash or cement or silica or red mud or pot liner residue or radioactive isotopes or irradiated lead or hazardous metals or flue-gas desulfurization residue and combinations thereof.

18. A method for stabilizing and encapsulating red mud comprising:
   a) combining red mud with a solution containing a monovalent alkali metal to form a slurry; and
   b) allowing the slurry to cure.

19. The method as recited in claim 18 wherein the solution containing the monovalent alkali further comprises phosphoric acid and a compound selected from the group consisting of M-carbonate, M-bicarbonate, M-hydroxide, and combinations thereof, where M is a monovalent alkali metal.

20. The method as recited in claim 18 wherein the solution containing a monovalent alkali metal is a dihydrogen phosphate.

21. The crystalline ceramic waste form as recited in claim 13 wherein the binder chemically stabilizes and encapsulates the waste at temperatures not exceeding 75° C.

* * * * *

UNITED STATES PATENT AND TRADEMARK OFFICE
CERTIFICATE OF CORRECTION

PATENT NO. : 5,830,815
DATED : November 3, 1998
INVENTOR(S) : Arun S. Wagh, Dileep Singh, Seung-Young Jeong It is certified that error appears in the above-indentified patent and that said Letters Patent is hereby corrected as shown below:

Column 14, Line 26, Cancel "and" and insert --or--.

Signed and Sealed this

Twenty-seventh Day of April, 1999

Attest:

Q. TODD DICKINSON

*Attesting Officer*     *Acting Commissioner of Patents and Trademarks*